(12) United States Patent
Zhang et al.

(10) Patent No.: US 12,694,621 B2
(45) Date of Patent: Jul. 28, 2026

(54) FREE-FORM CURVED SURFACE SLICING METHOD AND DEVICE BASED ON IMPLICIT MODEL

(71) Applicant: HUAZHONG UNIVERSITY OF SCIENCE AND TECHNOLOGY, Hubei (CN)

(72) Inventors: Lichao Zhang, Hubei (CN); Si Chen, Hubei (CN); Senlin Wang, Hubei (CN); Jiang Huang, Hubei (CN); Jinxin Wu, Hubei (CN); Zihua Zhang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 170 days.

(21) Appl. No.: 18/740,495

(22) Filed: Jun. 11, 2024

(65) Prior Publication Data

US 2025/0014284 A1     Jan. 9, 2025

(30) Foreign Application Priority Data

Jul. 4, 2023     (CN) ......................... 202310815663.8

(51) Int. Cl.
*G06T 17/20*          (2006.01)
*B33Y 50/00*          (2015.01)
(52) U.S. Cl.
CPC ............. *G06T 17/205* (2013.01); *B33Y 50/00* (2014.12)
(58) Field of Classification Search
None
See application file for complete search history.

(56) References Cited

U.S. PATENT DOCUMENTS

2020/0209834 A1 * 7/2020 Behandish .............. G06F 30/20
2024/0045400 A1 * 2/2024 Jia ......................... B29C 64/386

FOREIGN PATENT DOCUMENTS

CN          106903889 A  *  6/2017  ............. B33Y 50/00
CN          112140552       12/2020
CN          115635096        1/2023

* cited by examiner

*Primary Examiner* — Tapas Mazumder
(74) *Attorney, Agent, or Firm* — JCIPRNET

(57)          ABSTRACT

Disclosed are free-form curved surface slicing method and device based on implicit model, includes following: (1) Using mesh model of layered curved surface to intersect with implicit model of a part to be manufactured to obtain contour lines; (2) Comparing rules for intersecting contour lines and meshes within mesh, mesh coordinates are substituted into implicit model, obtaining a position of an intersection point of contour lines in corresponding mesh; (3) Using interpolation method to calculate intersection coordinates of contour lines and mesh boundary, specifying storing sequence of interpolation points, storing intersection points of discrete line segments in mesh; (4) Merging unordered point sets obtained to establish topological relationship between point sets and discrete line segments, each line segment corresponds to two endpoints, each endpoint corresponds to two line segments, based on above, all points traversed will be connected into complete and ordered profile, that is sliced profile.

10 Claims, 4 Drawing Sheets

(a)      (b)      (c)      (d)

(e)      (f)      (g)      (h)

FREE-FORM CURVED SURFACE SLICING METHOD AND DEVICE BASED ON IMPLICIT MODEL

CROSS-REFERENCE TO RELATED APPLICATION

This application claims the priority benefit of China application serial no. 202310815663.8, filed on Jul. 4, 2023. The entirety of the above-mentioned patent application is hereby incorporated by reference herein and made a part of this specification.

BACKGROUND

Technical Field

The disclosure belongs to the technical fields related to three-dimensional printing and computer graphics, and more specifically, relates to a free-form curved surface slicing method and device based on an implicit model.

Description of Related Art

In additive manufacturing, a layer-by-layer additive processing method is adopted to form parts, such a method is characterized by high degree of freedom, low price, and flexible design and therefore has received a lot of attention. One of the key technologies of additive manufacturing is the layering technology for three-dimensional solid models. The current mainstream layering method is plane layering, which utilizes cross-section planes to layer the three-dimensional model in the Z direction. Although such a method is simple and efficient, it can only slice three-dimensional models with simple shapes and small sizes, and additional supports are required for parts with complex shapes. Accordingly, energy accumulation is very likely to occur and heat dissipation is not even. Also, it is difficult to omit the support and the step effect will be obvious, which increases the printing time and cost whiling reducing molding quality. In the existing slicing technology for additive manufacturing, slicing is generally performed on STL (Standard Triangulation Language) files, that is, triangular mesh models. Such a method is mature, versatile, and flexible, but when such a method is adopted to express models with complex structures, being restricted by the limitations of triangle accuracy and expression, the number of triangle meshes will increase dramatically, and file size will also become large, leading to that the computer's memory will be used up while files are read. In the meantime, the accuracy and robustness of STL model slicing are also affected by triangle self-overlap, hole defects, triangle degradation, triangles intersecting, and so on, leading to additional steps being required and even causing the problem of being unable to read files.

In order to solve the problems caused by planar layered slicing, practitioners in the field have provided some solutions. China patent application No. CN202211214101.X discloses a curved surface layered slicing method. This patent application first establishes the topology relationship between triangular patches in STL, thereby obtaining the triangular patch with an angle within 0° to 90° between the normal vector and the Z-axis, and the triangular patch is used as the base curved surface. The curved surface is separated from the model of the part to be printed to obtain the curved surface profile. Then the base curved surface is continuously shifted to generate a series of curved surface profiles. However, the above method also has some problems. First of all, this method requires establishing the topological structure of the triangles in the STL model. When the internal structure of the STL model is complex, for example, in the case of a lattice structure, in order to express the surface information, a huge triangular mesh is required, and such large STL file cannot be read by the computer and will use up the entire computer memory. Besides, the probability of internal errors such as holes and triangle overlap will also increase, and additional steps will be required for processing. In addition, the initial curved surface separated from the part to be printed by the above patent application only obtains a triangular mesh with an angle within 0° to 90° between the normal vector and the Z-axis. There may be a curved surface with holes in the middle, or modeling might not be able to be performed on the initial curved surface layer. The above issues are not discussed in the above patent application, and the problem of free-form curved surface delamination remains unsolved. Patent application No. CN202010719380.X provides a curved surface layered slicing method based on point cloud. First of all, a bounding box for the point cloud model is established, the bounding box is divided into mesh points with a side length of 3 mm, then the coordinates of the mesh points in the point cloud model are determined, k dimensions are adopted to search for the nearest neighbor points of the mesh points, and local least squares plane fitting is performed to obtain the local normal vector. Thereafter, the depth value of the mesh points is calculated, and the three-dimensional point cloud curved surface is shifted in the Z direction, thereby obtaining the layered curved surface. However, such a method simulates the model point cloud with a 3 mm wide mesh. For models with internal filled lattice structures, it is difficult to obtain accurate internal layered curved surfaces. Moreover, because the internally filled lattice structures are generally small in size and can only be represented by a point cloud, such a method cannot be used to generate accurate layered curved surfaces for models with complex structures. Therefore, this field urgently needs an efficient and direct curved surface layering method for complex structures with low memory consumption.

SUMMARY

In view of the above defects or the needs for improvement of the existing technology, the present disclosure provides a free-form curved surface slicing method and device based on an implicit model, which performs direct slicing based on the implicit model, so that conventional mesh models are not required for the parts to be processed, and there is no need to establish mesh topological relationships. Besides, it is not necessary to store all patch information, and there is no need to establish topological relationships between meshes, and no additional information needs to be stored. In this way, curved surface slicing may be performed directly on implicit models, especially for complex models filled with lattice structures. Performing curved surface slicing directly does not require the consumption of a large amount of computer memory, and the requirement of curved surface layering for processing large-size and complex models may be realized.

In order to achieve the above purpose, in an aspect of the present disclosure, a free-form curved surface slicing method based on an implicit model is provided, which is characterized in that the method includes the following steps:

Step 1: The implicit model and layered curved surface of the part to be manufactured are determined, and the implicit model is the distance field.

Step 2: The mesh model of the layered curved surface is utilized to intersect with the implicit model of the part to be manufactured to obtain contour lines.

Step 3: The rules for intersecting contour lines and mesh are compared within the mesh, and the mesh coordinates are substituted into the implicit model, then the intersection of contour lines and the mesh is compared based on the obtained relationship between the mesh vertices and the model, thereby obtaining the position of the intersection point of the contour lines in the corresponding mesh.

Step 4: Based on the mesh coordinates and the values of these mesh coordinates calculated in the implicit model, the interpolation method is utilized to calculate the intersection coordinates of the contour lines and the mesh boundary, and then the intersection points of discrete line segments are stored in the mesh, wherein direction attributes are assigned to the corresponding discrete line segments when storing intersection points of discrete line segments in the mesh.

Step 5: The unordered point sets obtained in Step 4 are merged to establish the topological relationship between the point sets and discrete line segments. That is, each line segment corresponds to two endpoints, and each endpoint corresponds to two line segments. By finding a line segment and locating the starting point and end point of the line segment based on the direction of the line segment, and the end point of this line segment has the same coordinates as the starting point of another line segment, that is, by finding the next line segment adjacent to this line segment, after traversing all the points, a complete and ordered profile will be connected, thus obtaining a sliced profile.

Further, after Step 5, the method further includes the step of shifting the input layered curved surface in the printing direction according to the layer thickness, and Step 2 to Step 5 are repeated to generate all the layered curved surface slices of the part model to be manufactured.

Further, layered curved surfaces include UV curved surfaces, STL file curved surfaces, and curved surface formulas.

Furthermore, the distance field utilizes the model surface as the distance field boundary, and the shortest distance between any point in the space and the model boundary is defined as the value of the point in the distance field. If the midpoint of the space is inside the model distance field, the value of the distance field of this point is negative; if the midpoint of the space is outside the model distance field, the value of the distance field is positive; if the midpoint of the space is at the model boundary, the value of the distance field is 0.

Furthermore, if the layered curved surface is a formula curved surface, it is necessary to perform division according to the length direction and the width direction of the curved surface. When the line segments are intersected with each other, a quadrilateral mesh may be formed.

Furthermore, if the input layered curved surface is a curved surface formula, it is also necessary to enter the mesh size to be divided. According to the input mesh size, the division is performed evenly in the length direction and the width direction of the curved surface formula, the mesh is obtained through intersection. Each mesh is marked with an ID number, and the coordinates of the subsequent mesh vertices are calculated in real time based on the ID number.

Furthermore, a direction attribute is assigned to the calculated point set and the corresponding line segment, that is, it is specified that the direction of the line segment always satisfies the counterclockwise direction surrounding the internal vertices.

Moreover, if the layered curved surface is a curved surface formula, the mesh vertex coordinates are calculated based on the ID number and mesh size. If the layered curved surface is a UV curved surface or STL file, the mesh vertex coordinates in the file are directly read and the mesh vertex coordinates are substituted in the implicit model to get the corresponding value.

The present disclosure further provides a computer-readable storage medium that stores machine-executable instructions. When the machine-executable instructions are provoked and executed by a processor, the machine-executable instructions cause the processor to implement the free-form curved surface slicing method based on the implicit model as described above.

The present disclosure further provides a free-form curved surface slicing system based on an implicit model. The system includes a memory and a processor. The memory stores a computer program. When the processor executes the computer program, the free-form curved surface slicing method based on the implicit model as described above is executed.

Generally speaking, compared with the existing technology through the above technical solutions conceived by the present disclosure, the free-form curved surface slicing method and device based on the implicit model provided by the present disclosure mainly have the following advantageous effects:

1. The present disclosure performs direct slicing based on the implicit model, so that conventional mesh models are not required for the parts to be processed, and there is no need to establish mesh topological relationships. Besides, it is not necessary to store all patch information, and there is no need to perform additional processing on patch errors. In this way, curved surface slicing may be performed directly on implicit models, especially for complex models filled with lattice structures. Performing curved surface slicing directly does not require the consumption of a large amount of computer memory, and the requirement of curved surface layering for processing large-size and complex models may be realized.

2. The present disclosure assigns direction attributes to contour line segments. Without having to use a certain line segment as the starting line segment and gradually calculating downwards, the present method decouples mesh vertex calculation, interpolation point coordinate calculation and subsequent ordered profile processing. In this way, it is easy to implement multi-threaded parallel computing to improve efficiency, and efficient calculation of the coordinates of line segment interpolation points may be achieved.

3. For meshing the input curved surface formula, only the mesh ID number is stored. The subsequent calculation of the mesh vertex in the implicit model and the linear interpolation to obtain the mesh vertex coordinates makes it possible to directly obtain the mesh vertex coordinates through the mesh ID number and mesh size. For other mesh models such as UV curved surfaces and STL files, the mesh vertex coordinates in the file are directly read.

4. When sorting discrete line segments and obtaining an ordered profile, the method of establishing a topological relationship between a point set and a line segment is adopted. The key part of this method lies in establishing a topological relationship, which requires the duplicate points in the point set, and by merging duplicate points, it is possible to point to the line segment numbers at both ends of the duplicate points. Such a method may also be applied to conventional layering results based on mesh models.

Figure 2:
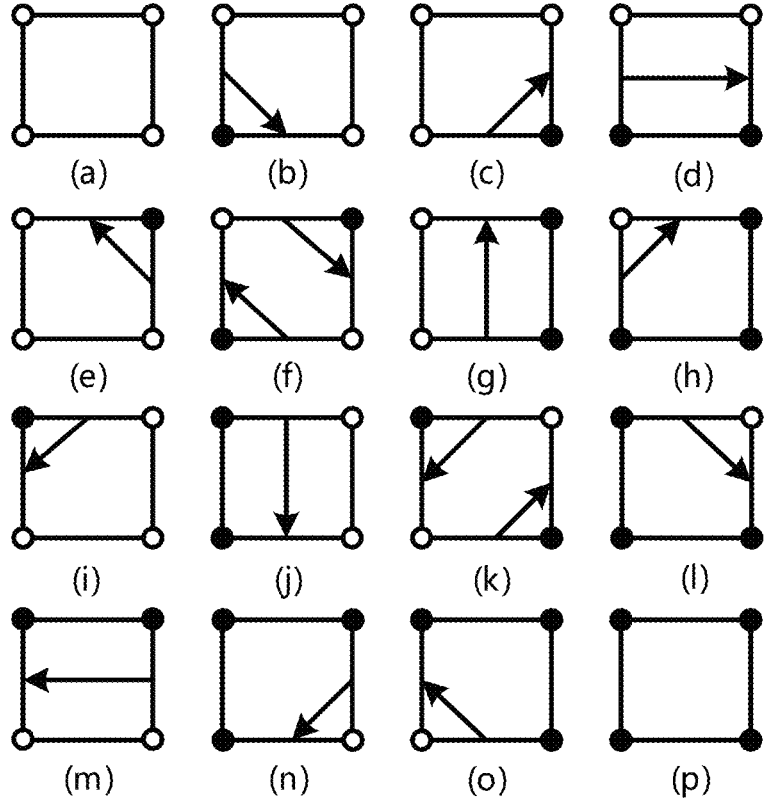

(a) to (p) in FIG. 2 are 16 situations where the interpolation points are in the quadrilateral mesh. The storage order of the interpolation points is shown as the direction of the arrow.

Figure 3:
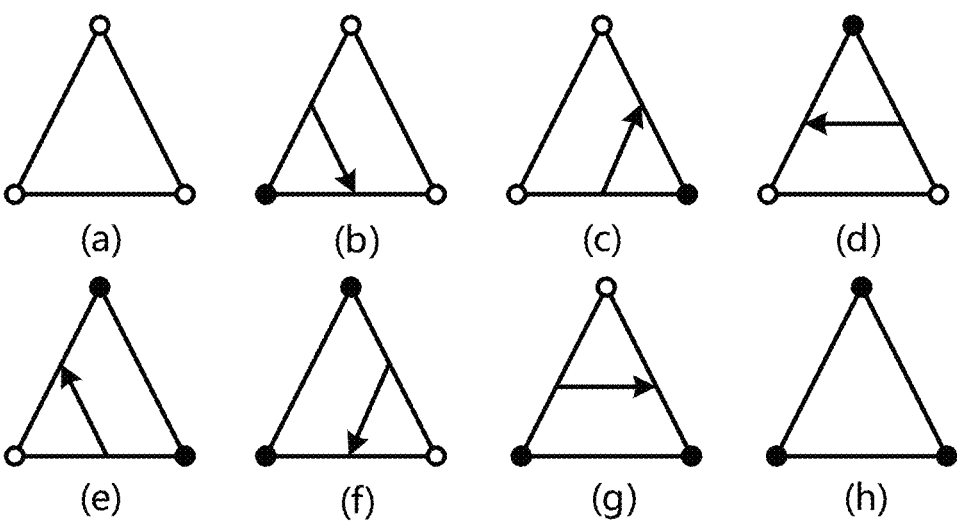

(a) to (h) in FIG. 3 are 8 situations where the interpolation points are in the triangular mesh. The storage order of the interpolation points is shown as the direction of the arrow.

Figure 4:
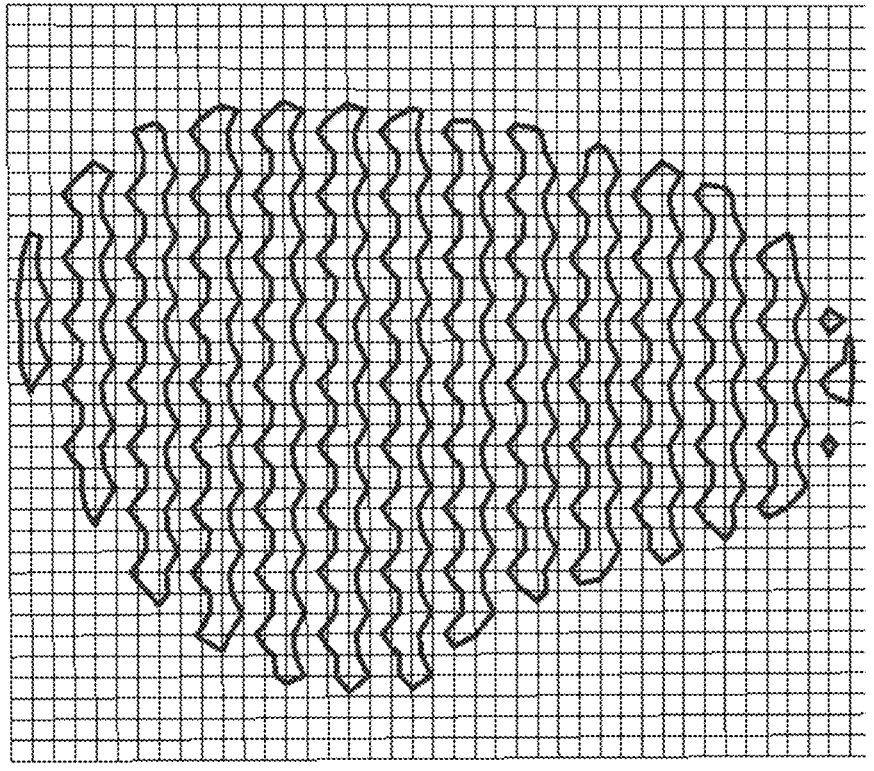

FIG. 4 is a schematic diagram of discrete line segments of a single layer slice.

Figure 5:
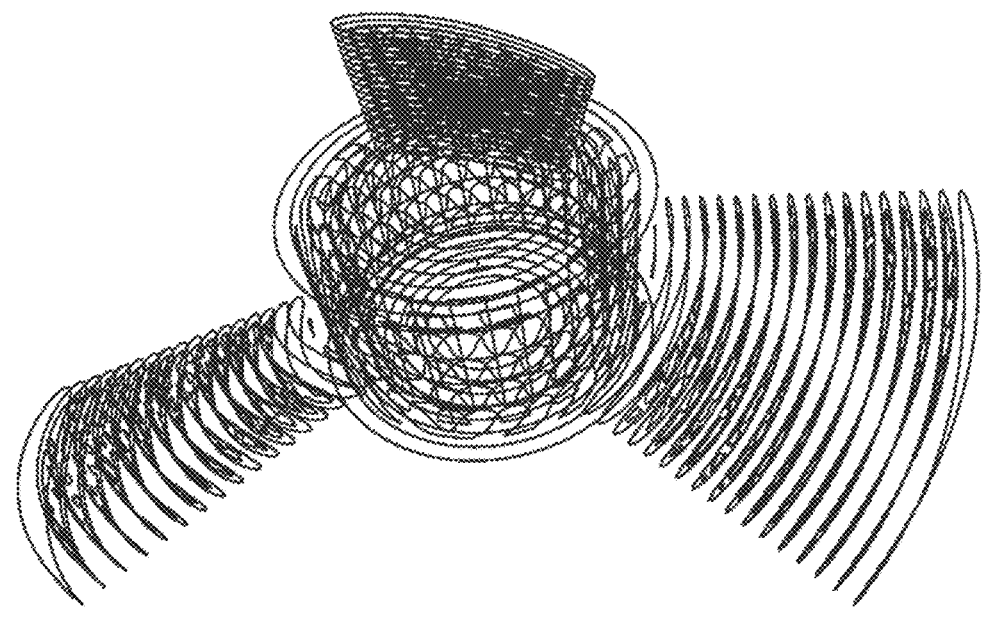

FIG. 5 is a schematic diagram of the cylindrical layering of an internally filled lattice structure.

Figure 6:
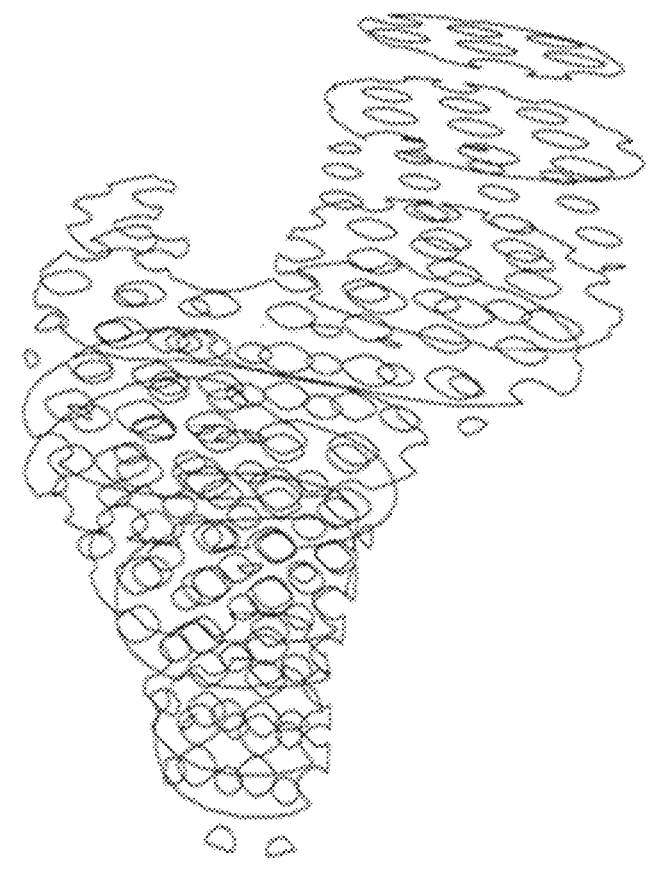

FIG. 6 is a planar layered schematic diagram of the internal filling lattice.

DESCRIPTION OF THE EMBODIMENTS

In order to make the purpose, technical solutions and advantages of the present disclosure more clear, the present disclosure will be further described in detail below with reference to the accompanying drawings and embodiments. It should be understood that the specific embodiments described here are only used to explain the present disclosure and are not intended to limit the present disclosure. In addition, the technical features involved in the various embodiments of the present disclosure described below can be combined with each other as long as they do not conflict with each other.

Figure 1:
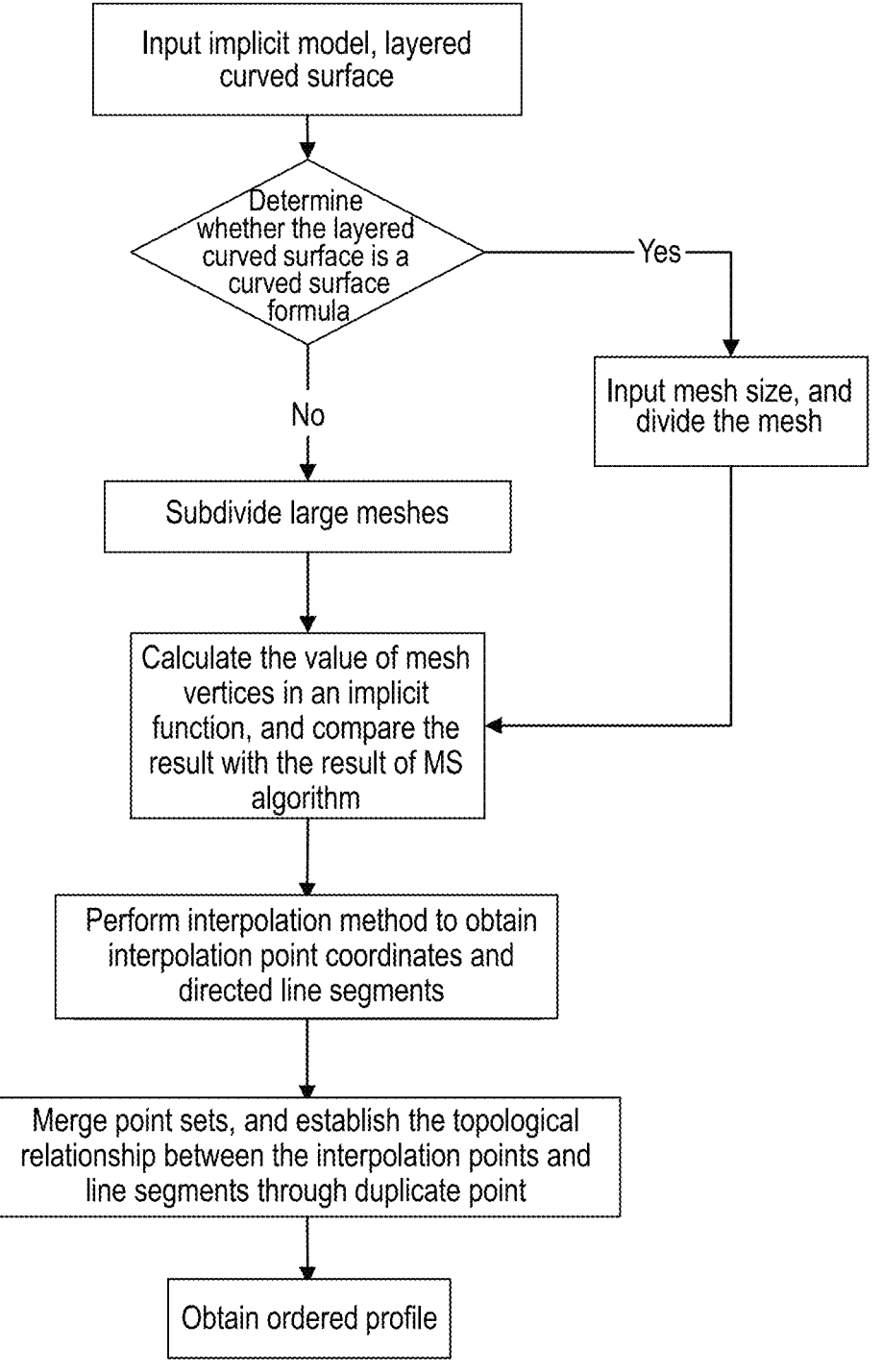
FIG. 1 is a schematic flow chart of a free-form curved surface slicing method based on an implicit model provided by the present disclosure.

Please refer to FIG. 1. The present disclosure provides a free-form curved surface slicing method based on an implicit model. The slicing method mainly includes the following steps:

Step 1: The implicit model and layered curved surface of the part to be manufactured are determined. The implicit model includes distance field, temperature field, gravitational field and other arbitrary mathematical space functions.

Specifically, the layered curved surfaces include format data such as UV curved surfaces, STL file curved surfaces, curved surface formulas or other mesh files. The implicit model of the model refers to an expression of the entity model through the implicit model. The expression method includes functional form, discrete data information, array expression, etc. The amount of data is small and no entity mesh information is required. Common implicit models include distance fields, contour line fields, temperature fields or other arbitrary mathematical space functions. This implementation adopts distance fields. The distance field adopts the model surface as the distance field boundary, and defines the shortest distance between any point in the space and the model boundary as the value of this point in the distance field. If the midpoint of the space is inside the model distance field, the value of the distance field of this point is negative; if the midpoint of the space is outside the model distance field, the value of the distance field is positive; if the midpoint of the space is at the model boundary, the value of the distance field is 0. Such a scalar field is able to fully express model information. In the meantime, the intersection operations of merging and subtracting may be easily realized with the assistance of maximum and minimum formulas. When generating internal lattice structures, there is no need to use mesh expressions, curved surface formulas may be used to directly generate periodic lattice structures inside the model, such as $\emptyset p(x, y, z) = \cos X + \cos Y + \cos Z = C$.

In this implementation, the implicit model of the part model to be manufactured is input and the distance field is adopted.

In Step 2, the mesh model of the layered curved surface is used to intersect with the implicit model of the part to be manufactured to obtain contour lines.

By using the mesh model of layered curved surfaces, such as the quadrilateral mesh on the UV curved surface, the triangular mesh on the STL model, or the mesh form that is directly divided in the curved surface formula (such as the cylindrical formula) to intersect with the implicit model of the part to be manufactured to obtain contour lines.

The basic elements of UV curved surfaces, STL files or other mesh files are quadrilateral or triangular meshes. If the mesh is large and does not meet the required accuracy of the curved surface profile, a subdivision algorithm may be used to re-divide the coarser mesh. For input formula curved surfaces, such as basic mathematical curved surfaces like cylinders, spheres, and rectangular planes, the division may be performed according to the length direction and width direction of the curved surface. When the line segments intersect with each other, a quadrilateral mesh may be divided.

In the implementation, if the input layered curved surface is a curved surface formula, it is also necessary to enter the mesh size to be divided. According to the input mesh size, the division is performed evenly in the length direction and the width direction of the curved surface formula, the mesh is obtained through intersection. Each mesh is marked with an ID number, and the coordinates of the subsequent mesh vertices are calculated in real time based on the ID number. Therefore, only the ID number is stored, but not the vertex coordinates of the mesh, thereby saving the trouble of storing adjacent mesh vertices multiple times and reducing memory consumption. If mesh files, such as UV curved surfaces and STL files, are input, the meshes of some of the files are large and do not satisfy the specified profile accuracy, it is necessary to use a subdivision algorithm to subdivide the meshes.

In Step 3, the rules for intersecting contour lines and mesh are compared within the mesh, and the mesh coordinates are substituted into the implicit model, then the intersection of contour lines and the mesh is compared based on the obtained relationship between the mesh vertices and the model, thereby obtaining the position of the intersection point of the contour lines in the corresponding mesh.

Step 3 adopts a variant of the Marching Squares algorithm, which is an algorithm for generating contour line profiles within a mesh. There are multiple cases of contour lines passing through each mesh, there are 16 situations in quadrilaterals and eight situations in triangles. These small line segments constitute the contour line profiles.

In Step 4, based on the mesh coordinates and the values of the mesh coordinates calculated in the implicit model, the interpolation method is utilized to calculate the intersection coordinates of the contour lines and the mesh boundary, and then the intersection points of discrete line segments are stored in the mesh, wherein direction attributes are assigned to the corresponding discrete line segments when storing intersection points of discrete line segments in the mesh.

Interpolation is used to calculate the coordinates of the intersection of the contour lines and the mesh boundary. The mesh vertex coordinates are substituted into the implicit model to calculate the value as the weight of the interpolation. The interpolation method makes the obtained contour lines smoother. Linear interpolation is the default linear change between two points. The linear interpolation formula is as follows:

$$\frac{Q_h - B_h}{D_h - B_h} \approx \frac{f(Q_x, Q_y) - f(B_x, B_y, B_z)}{f(D_x, D_y) - f(B_x, B_y, B_z)}$$

The values are substituted into the formula to get the interpolation point coordinates. The calculated point set and the corresponding line segment are assigned with a direction attribute, that is, it is specified that the direction of the line segment always satisfies the counterclockwise direction surrounding the internal vertices.

In this implementation, starting from any mesh, if the layered curved surface is a curved surface formula, the mesh vertex coordinates are calculated based on the ID number and mesh size. If the layered curved surface is a UV curved surface or STL file, the mesh vertex coordinates in the file are read directly. The mesh vertex coordinates are substituted into the implicit model for calculation, and the corresponding values are obtained. Two situations are applied to each vertex, the vertex is either inside the implicit model or outside the implicit model. In the case of quadrilateral mesh, there are 16 situations as shown in FIG. 2; In the case of triangular mesh, there are 8 situations as shown in FIG. 3. For larger meshes in the original file, the subdivision algorithm may be used to subdivide the mesh to obtain finer and smoother contour line segments. According to the relative position of the intersection line segment within the mesh and the mesh boundary, the value of the mesh endpoint on the boundary that intersects with the intersection point in the implicit model is used as the weight. The intersection coordinates are calculated according to the linear interpolation formula and stored according to the direction of the line segment arrow as shown in FIG. 2, that is, the data structure is defined, the starting point and end point of the line segment are stored respectively, then direction attribute is assigned to the line segment to satisfy the rule that outer profile of the layered curved surface profile is counterclockwise and the inner profile is clockwise while each line segment is provided with an ID number. Finally, the computer stores the ID number of the line segment and the intersection coordinates.

In Step 5, the unordered point sets obtained in Step 4 are merged to establish the topological relationship between the point sets and discrete line segments. That is, each line segment corresponds to two endpoints, and each endpoint corresponds to two line segments. By finding a line segment and locating the starting point and end point of the line segment based on the direction of the line segment, and the end point of this line segment has the same coordinates as the starting point of another line segment, that is, by finding the next line segment adjacent to this line segment, after traversing all the points, a complete and ordered profile will be connected, thus obtaining a sliced profile.

The point sets calculated in Step 4 are all unordered and discrete line segment points. Only the line segments within the mesh have directions, and each point is stored twice. In order to generate an ordered, closed complete profile, the disordered point sets are merged to establish a topological relationship between point sets and discrete line segments. Under the circumstances, the same points are located on two line segments. The two line segments are spatially continuous, the ID numbers of the two line segments are stored in adjacent locations and another point of the line segment is also found, and then the duplicate point is found. After traversing all the points, a complete and ordered profile will be connected.

In this implementation, a large number of discrete directed line segments and interpolation intersections are obtained in the previous step. The line segments are not connected sequentially and cannot be used as the curved surface layering result of subsequent path planning, as shown in FIG. 4. Each interpolation point is stored twice in the point set, and the topological relationship between the point set and the line segment may be established through the duplicate points. First, the endpoint of a certain line segment is randomly selected as the starting point. If this point is the starting point, the other endpoint of the same line segment is searched through the corresponding relationship between the line segments, and the line segment where the other duplicate point is searched based on this endpoint. If this point is the endpoint of the line segment, it is necessary to find a duplicate point of this point, so the next line segment may be located and stored in sequence. In this way, it is possible to save the trouble of determining the sequential positions of the starting interpolation point. After traversing all line segments, an ordered and complete slice profile may be generated. This implementation method is explained in conjunction with the hash table method. The duplicate points have the same storage location in the hash table, so the ID number at the same point with the same location in the hash table may be stored. The hash table method may reduce the complexity of merging duplicate points, and other methods such as sorting and brute force search methods may be used to merge duplicate points and establish topological relationships.

The method further includes the step of shifting the input layered curved surface in the printing direction according to the layer thickness, and Step 2 to Step 5 are repeated to generate all the layered curved surface slices of the part model to be manufactured, as shown in FIG. 5 and FIG. 6.

The present disclosure further provides a computer-readable storage medium that stores machine-executable instructions. When the machine-executable instructions are invoked and executed by a processor, the machine-executable instructions cause the processor to implement the free-form curved surface slicing method based on the implicit model as described above.

The present disclosure further provides a free-form curved surface slicing system based on an implicit model. The system includes a memory and a processor. The memory stores a computer program. When the processor executes the computer program, the free-form curved surface slicing method based on the implicit model as described above is executed.

It is easy for those skilled in the art to understand that the above descriptions are only preferred embodiments of the present disclosure and are not intended to limit the present disclosure. Any modifications, equivalent substitutions and improvements, etc., made within the spirit and principles of the present disclosure should all be included in the scope to be protected by the present disclosure.

What is claimed is:

1. A free-form curved surface slicing method based on an implicit model, comprising:
   step 1, determining the implicit model and a layered curved surface of a part to be manufactured, the implicit model is a distance field or a temperature field;

step 2, using a mesh model of the layered curved surface to intersect with the implicit model of the part to be manufactured to obtain contour lines;

step 3, comparing rules for intersecting the contour lines and meshes, and mesh coordinates are substituted into the implicit model, then an intersection of the contour lines and the mesh is compared based on an obtained relationship between mesh vertices and the implicit model, thereby obtaining a position of an intersection point of the contour lines in a corresponding mesh;

step 4, based on the mesh coordinates and values corresponding to the mesh coordinates, using an interpolation method to calculate intersection coordinates of the contour lines and a mesh boundary, and then storing intersection points of discrete line segments in the mesh, wherein the values are calculated in the implicit model, wherein direction attributes are assigned to corresponding discrete line segments when storing the intersection points of the discrete line segments in the mesh;

step 5, merging unordered point sets including the intersection points obtained in step 4 to establish a topological relationship between the point sets and the discrete line segments, that is, each line segment corresponds to two endpoints, and each of the endpoints corresponds to two line segments, by finding one of the line segments and locating a starting point and an endpoint of the line segment based on a direction of the line segment, and the end point of the line segment has the same coordinates as a starting point of another line segment, that is, by finding the next line segment adjacent to the line segment, after traversing all the points, a complete and ordered profile is connected, which is referred as an sliced profile.

2. The free-form curved surface slicing method is based on the implicit model according to claim 1, wherein after step 5, the method further comprises shifting an input layered curved surface in a printing direction according to a layer thickness, and step 2 to step 5 are repeated to generate all layered curved surface slices of the part model to be manufactured.

3. The free-form curved surface slicing method is based on the implicit model according to claim 1, wherein the layered curved surfaces comprise UV curved surfaces, STL file curved surfaces, and formula curved surface.

4. The free-form curved surface slicing method is based on the implicit model according to claim 1, wherein the implicit model is the distance field, the distance field utilizes a model surface as a distance field boundary, and a shortest distance between any point in a space and a model boundary is defined as a value of the point in the distance field; if a midpoint of the space is inside a model distance field, a value of the distance field of the point is negative; if the midpoint of the space is outside the model distance field, the value of the distance field is positive; if the midpoint of the space is at the model boundary, the value of the distance field is 0.

5. The free-form curved surface slicing method is based on the implicit model according to claim 1, wherein if the layered curved surface is a formula curved surface, performing division according to a length direction and a width direction of the curved surface, when the line segments are intersected with each other, a quadrilateral mesh is divided.

6. The free-form curved surface slicing method is based on the implicit model according to claim 1, wherein if an input layered curved surface is a curved surface formula, entering a mesh size to be divided; according to the input mesh size, the division is performed evenly in a length direction and a width direction of the curved surface formula, the mesh is obtained through intersection, the mesh is marked with an ID number, and coordinates of subsequent mesh vertices are calculated in real time based on the ID number.

7. The free-form curved surface slicing method is based on the implicit model according to claim 1, wherein a direction attribute is assigned to calculated point sets and corresponding line segments, that is, it is specified that a direction of the line segment always satisfies a counterclockwise direction surrounding internal vertices.

8. The free-form curved surface slicing method is based on the implicit model according to claim 1, wherein if the layered curved surface is the curved surface formula, mesh vertex coordinates are calculated based on ID number and mesh size, if the layered curved surface is an UV curved surface or an STL file, the mesh vertex coordinates in the file are directly read and the mesh vertex coordinates are substituted in the implicit model to get a corresponding value.

9. A non-transitory computer-readable storage medium, which stores machine-executable instructions, wherein when the machine-executable instructions are provoked and executed by a processor, the machine-executable instructions cause the processor to implement the free-form curved surface slicing method based on the implicit model according to claim 1.

10. A free-form curved surface slicing system based on an implicit model, wherein the system comprises a memory and a processor, the memory stores a computer program, and when the processor executes the computer program, the free-form curved surface slicing method based on the implicit model according to claim 1 is executed.

* * * * *